United States Patent
Zhang et al.

(10) Patent No.: US 12,401,587 B2
(45) Date of Patent: Aug. 26, 2025

(54) DATA PROCESSING METHOD AND APPARATUS, STORAGE MEDIUM, AND ELECTRONIC APPARATUS

(71) Applicant: ZTE Corporation, Shenzhen (CN)

(72) Inventors: Zheng Zhang, Shenzhen (CN); Min Xiao, Shenzhen (CN); Yuehua Wei, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 411 days.

(21) Appl. No.: 18/026,961

(22) PCT Filed: Jun. 22, 2021

(86) PCT No.: PCT/CN2021/101637
§ 371 (c)(1),
(2) Date: Mar. 17, 2023

(87) PCT Pub. No.: WO2022/062506
PCT Pub. Date: Mar. 31, 2022

(65) Prior Publication Data
US 2023/0336459 A1    Oct. 19, 2023

(30) Foreign Application Priority Data
Sep. 22, 2020   (CN) .......................... 202011003565.7

(51) Int. Cl.
*H04L 45/16* (2022.01)
*H04L 45/302* (2022.01)
*H04L 45/50* (2022.01)

(52) U.S. Cl.
CPC ............ *H04L 45/16* (2013.01); *H04L 45/306* (2013.01); *H04L 45/50* (2013.01)

(58) Field of Classification Search
None
See application file for complete search history.

(56) References Cited

U.S. PATENT DOCUMENTS

| | | |
|---|---|---|
| 2015/0078377 A1 | 3/2015 | Wijnands et al. |
| 2018/0278521 A1 | 9/2018 | Pfister et al. |

(Continued)

FOREIGN PATENT DOCUMENTS

| | | |
|---|---|---|
| CN | 106921579 A | 7/2017 |
| CN | 107124366 A | 9/2017 |

(Continued)

OTHER PUBLICATIONS

International Search Report for corresponding application PCT/CN2021/101637 filed Jun. 22, 2021; Mail date Sep. 26, 2021.

(Continued)

*Primary Examiner* — Christine T Duong
(74) *Attorney, Agent, or Firm* — CANTOR COLBURN LLP

(57) ABSTRACT

Provided in the embodiments of the present disclosure are a data processing method and apparatus, a storage medium, and an electronic apparatus. The data processing method includes: receiving a multicast packet requiring Service Function Chaining (SFC) processing; encapsulating the multicast packet to obtain a target packet after encapsulation, wherein the target packet comprises an SFC path indication and an egress device-based Bit Indexed Explicit Replication (BIER) header; and sending the target packet to at least one Service Function Forwarder (SFF) according to the SFC path indication, wherein a last-hop SFF is used for sending the multicast packet to at least one egress device according to the egress device-based BIER header, so that the target packet reaches the egress device.

20 Claims, 7 Drawing Sheets

(56) References Cited

U.S. PATENT DOCUMENTS

| | | |
|---|---|---|
| 2018/0287934 A1 | 10/2018 | Wang |
| 2018/0287935 A1* | 10/2018 | Wang .................. H04L 12/4625 |
| 2018/0309675 A1* | 10/2018 | Xu .......................... H04L 45/03 |
| 2019/0372877 A1 | 12/2019 | Nainar et al. |
| 2019/0394059 A1* | 12/2019 | Zhang .................... H04L 45/16 |

FOREIGN PATENT DOCUMENTS

| | | |
|---|---|---|
| CN | 107171977 A | 9/2017 |
| CN | 107204867 A | 9/2017 |
| CN | 108023832 A | 5/2018 |
| CN | 110784411 A | 2/2020 |
| CN | 111669330 A | 9/2020 |
| CN | 112491729 A | 3/2021 |
| EP | 3382955 A1 | 10/2018 |
| EP | 3432514 A1 | 1/2019 |
| WO | 2016198013 A1 | 12/2016 |
| WO | 2016198015 A1 | 12/2016 |
| WO | 2017024818 A1 | 2/2017 |
| WO | 2017211141 A1 | 12/2017 |
| WO | 2019214589 A1 | 11/2019 |

OTHER PUBLICATIONS

European Search Report for corresponding application EP21870886; Dated Feb. 27, 2024.

\* cited by examiner

DATA PROCESSING METHOD AND APPARATUS, STORAGE MEDIUM, AND ELECTRONIC APPARATUS

CROSS REFERENCE

This application is a National Stage Filing of the PCT International Application No. PCT/CN2021/101637 filed on Jun. 22, 2021, which claims priority to Chinese Application No. 202011003565.7 filed on Sep. 22, 2020, the entirety of which is herein incorporated by reference.

TECHNICAL FIELD

Embodiments of the present disclosure relate to the field of communications, and in particular, to a data processing method and apparatus, a storage medium, and an electronic apparatus.

BACKGROUND

Service Function Chaining (SFC) is an important means for performing service processing on demand on data packets in a network function virtualization scenario. The end-to-end transmission of a data packet generally needs to be performed along a plurality of different service function nodes according to a certain sequence, so as to ensure that the network can provide a service (such as firewall and load balancing which are common in a traditional network, and other services in a new network) required by a user according to a service requirement of the user.

In addition to a traditional Protocol Independent Multicast (PIM) (RFC7761) technology, the multicast technology also includes a new Bit Indexed Explicit Replication (BIER) (RFC8279) technology. The BIER technology performs forwarding according to a specific Bit Index Forwarding Table (BIFT), and a state of a multicast stream does not need to be saved in a network.

Multicast is being more and more widely applied in the Internet, such as multi-party conference, remote education, remote medicine, and webcast. For these data packets that need to be multicast, a series of service assurance functions may need to be provided as required before the data packets can be finally sent to the user. In addition, when there are multiple backup devices provided for implementing the network services, how to achieve automatic and optimized route selection is also an important problem that needs to be solved currently. These factors will directly affect the assurance functions and effects of multicast services.

There are several application scenarios when the SFC is combined with a multicast technology. In the first scenario, the SFC technology is implemented based on a cloud technology, the deployment of the same Service Function (SF) does not require participation of a underlying forwarding technology, and a multicast packet is firstly processed by the SFC technology and then forwarded via multicast. In the second scenario, the deployment of the SFC technology is associated with an underlying forwarding technology, and the deployment of the same SF is combined with multicast forwarding so as to achieve an optimal forwarding effect. Currently, there are some researches on the two scenarios in the related art, but the related art relates only to traditional multicast technologies, which cannot be combined with the new BIER multicast technologies due to high complexity in the technology algorithm and high difficulty in application deployment. All these disadvantages prevent the SFC technology from being used in combination with the multicast technology, which greatly limits the deployment of the SFC technology, and cannot provide assurance for the multicast technology by the SFC technology.

FIG. 1 is a schematic diagram of transmission of network data in the related art. FIG. 1 shows a network, in which Rx represents a node for forwarding, such as a router or a switch, R1 serves as a Classifier in an SFC, R2 and R4 both serve as Service Function Forwarders (SFF), Rcvx represents a receiver of traffic, Rcv1 is connected to R6, Rcv2 and Rcv3 are connected to R5, Rcv4 is connected to R7, and SFx represents different Service Functions.

It is assumed that there is currently a multicast packet (S1, G1) (S representing a source address, and G representing a group address), and the multicast packet needs to reach receivers Rcv1-Rcv4. If the multicast traffic needs to be first subjected to assurance processing by SF1 and SF3 before reaching the several receivers, a current processing flow is generally as follows: after the traffic enters the classifier R1, R1 processes the traffic and determines that a service function path of the traffic is SF1, SF3; the traffic is firstly transmitted to R2 for SF1 processing, and is then transmitted to R4 for SF3 processing; after being provided with SFC assurance, the traffic is returned to R1, where the traffic is then forwarded according to a multicast tree of the traffic; for example, the traffic passes R3 and then reaches R5, where the traffic is sent to two receivers Rcv2 and Rcv3 connected with R5; the traffic is also forwarded by R5 to R7, where the traffic is forwarded to the receiver Rcv4; and the traffic is also forwarded by R7 to R6, where the traffic is then forwarded to the receiver Rcv1.

Because a traditional multicast tree is generated by a protocol such as PIM, each multicast packet has a multicast tree, and the distribution of the multicast tree is not consistent with that of the SFF, for example, the SFF may even not be on the multicast tree. It can be seen from the foregoing forwarding flow that, after the traffic is processed by the SFC, the traffic usually can only be sent back to the ingress node so that the traffic can be forwarded according to the multicast tree, and the roundabout processing of the traffic causes a great waste of network resources.

Aiming at the problem in the related art that roundabout processing of a multicast traffic when forwarding the multicast traffic according to a multicast tree causes a great waste of network resources, no solution has been proposed.

SUMMARY

The embodiments of the present disclosure provide a data processing method and apparatus, a storage medium, and an electronic apparatus, which may at least solve the problem in the related art that roundabout processing of a multicast traffic when forwarding the multicast traffic according to a multicast tree causes a great waste of network resources.

According to the embodiments of the present disclosure, provided is a data processing method applied to an ingress device, wherein the data processing method includes:
  receiving a multicast packet requiring Service Function Chaining (SFC) processing;
  encapsulating the multicast packet to obtain a target packet after encapsulation, wherein the target packet includes an SFC path indication and an egress device-based Bit Indexed Explicit Replication (BIER) header; and
  sending the target packet to at least one Service Function Forwarder (SFF) according to the SFC path indication, wherein a last-hop SFF is used for sending the multicast packet to at least one egress device according to the egress device-based BIER header.

In some embodiments, encapsulating the multicast packet to obtain the target packet after encapsulation includes:
  encapsulating the multicast packet with an inner BIER packet, wherein the inner BIER packet carries a Bit-Forwarding Router Identifier (BFR-ID) of the egress device, and the multicast packet is encapsulated as a payload after the egress device-based BIER header; and
  encapsulating the multicast packet, encapsulated with the inner BIER packet, together with the SFC path indication to obtain the target packet.

In some embodiments, encapsulating the multicast packet, encapsulated with the inner BIER packet, together with the SFC path indication to obtain the target packet includes one of:
  encapsulating the multicast packet, encapsulated with the inner BIER packet, together with a Network Service Header (NSH) to obtain the target packet, wherein the NSH carries the SFC path indication;
  encapsulating the multicast packet, encapsulated with the inner BIER packet, by using an Internet Protocol version 6 (IPv6) to obtain the target packet, wherein an IPv6 header includes a Segment Routing Header (SRH), and the SRH carries the SFC path indication;
  encapsulating the multicast packet, encapsulated with the inner BIER packet, by using a Multiprotocol Label Switching (MPLS) to obtain the target packet, wherein an MPLS protocol stack carries the SFC path indication.

In some embodiments, the data processing method further includes:
  indicating a type of the inner BIER packet through a Next Proto field in the NSH; or
  indicating the type of the inner BIER packet through a Next Header field in the IPv6 header; or
  indicating the type of the inner BIER packet through an MPLS label.

In some embodiments, the data processing method further includes:
  indicating an identifier of at least one receiving device through a BitString in the inner BIER packet.

In some embodiments, after encapsulating the multicast packet, encapsulated with the inner BIER packet, together with the SFC path indication to obtain the target packet, the data processing method further includes:
  establishing a Service Function Forwarder-based (SFF-based) BIER header; and
  encapsulating an outer BIER packet at an outer layer of the target packet, wherein the outer BIER packet carries the SFF-based BIER header.

In some embodiments, the data processing method further includes:
  indicating an SFF-based BFR-ID through a BitString in the outer BIER packet.

According to the embodiments of the present disclosure, also provided is a data processing method applied to a Service Function Forwarder (SFF). The data processing method includes:
  receiving a target packet sent by an ingress device according to a Service Function Chaining (SFC) path indication, wherein the target packet is a packet obtained by encapsulating, by the ingress device, a received multicast packet requiring SFC processing, and the target packet includes an SFC path indication and an egress device-based Bit Indexed Explicit Replication (BIER) header; and
  sending the multicast packet to at least one egress device according to the egress device-based BIER header.

In some embodiments, sending the multicast packet to the egress device according to the egress device-based BIER header includes:
  removing an outer encapsulation of the target packet to obtain the SFC path indication;
  sending the target packet to at least one SFF according to the SFC path indication, wherein the SFF is used for performing service function processing on the target packet;
  when the SFF is a last-hop SFF of SFC, decapsulating the SFC path indication of the target packet to obtain an inner BIER packet with which the multicast packet is encapsulated; and
  sending the multicast packet to the egress device according to the inner BIER packet.

In some embodiments, sending the multicast packet to the egress device according to the inner BIER packet includes:
  determining that the target packet is followed by a Network Service Header (NSH) packet according to indication of a Proto field in an outer BIER packet, and determining that the target packet is an inner BIER packet according to a Next Proto field in the NSH packet; or determining that the target packet is an inner BIER packet according to indication of an MPLS label or a Next Proto field of IPv6; and
  sending the multicast packet to the egress device according to the inner BIER packet.

In some embodiments, sending the target packet to the at least one SFF according to the SFC path indication includes:
  re-encapsulating the target packet with an outer BIER packet according to the SFC path indication, and setting a destination BitString of a BIER header of the outer BIER packet as a Bit-Forwarding Router Identifier (BFR-ID) of a next-hop SFF; and
  sending the target packet to the at least one SFF according to a pre-generated BIER forwarding table entry.

In some embodiments, sending the multicast packet to the egress device according to the inner BIER packet includes:
  when the SFF is the last-hop SFF in the SFC path indication, removing the encapsulation of the target packet until the inner BIER packet and the carried multicast packet remain, and sending the multicast packet to the egress device according to a pre-generated BIER forwarding table entry and a destination BitString in the inner BIER packet.

In some embodiments, the data processing method further includes:
  when it is determined that there are a plurality of next-hop SFFs in the BIER forwarding table entry according to the SFC path indication, determining the next-hop SFF according to shortest path criteria and forwarding the target packet to the next-hop SFF; or
  forwarding the target packet according to a pre-generated SFF-based forwarding complementary table entry, and correspondingly modifying a destination BitString in the inner BIER packet.

In some embodiments, the data processing method further includes:
  for a target SFF having backup, determining paths to respective egress devices; and
  establishing forwarding complementary table entries of the target SFF towards the respective egress devices according to shortest path criteria.

According to the embodiments of the present disclosure, also provided is a data processing apparatus applied to an ingress device. The data processing apparatus includes:
- a first receiving module, configured to receive a multicast packet requiring Service Function Chaining (SFC) processing;
- an encapsulating module, configured to encapsulate the multicast packet to obtain a target packet after encapsulation, wherein the target packet includes an SFC path indication and an egress device-based Bit Indexed Explicit Replication (BIER) header; and
- a first sending module, configured to send the target packet to at least one Service Function Forwarder (SFF) according to the SFC path indication, wherein a last-hop SFF is used for sending the multicast packet to at least one egress device according to the egress device-based BIER header.

In some embodiments, the encapsulating module includes:
- a first encapsulating sub-module, configured to encapsulate the multicast packet with an inner BIER packet, wherein the inner BIER packet carries a Bit-Forwarding Router Identifier (BFR-ID) of the egress device, and the multicast packet is encapsulated as a payload after the egress device-based BIER header; and
- a second encapsulating sub-module, configured to encapsulate the multicast packet, encapsulated with the inner BIER packet, together with the SFC path indication to obtain the target packet.

In some embodiments, the second encapsulating sub-module includes:
- a first encapsulating unit, configured to encapsulate the multicast packet, encapsulated with the inner BIER packet, together with a Network Service Header (NSH) to obtain the target packet, wherein the NSH carries the SFC path indication;
- a second encapsulating unit, configured to encapsulate the multicast packet, encapsulated with the inner BIER packet, by using an Internet Protocol version 6 (IPv6) to obtain the target packet, wherein an IPv6 header includes a Segment Routing Header (SRH), and the SRH carries the SFC path indication;
- a third encapsulating unit, configured to encapsulate the multicast packet, encapsulated with the inner BIER packet, by using a Multiprotocol Label Switching (MPLS) to obtain the target packet, wherein an MPLS protocol stack carries the SFC path indication.

In some embodiments, the data processing apparatus further includes:
- a first indicating unit, configured to indicate a type of the inner BIER packet through a Next Proto field in the NSH; or
- a second indicating unit, configured to indicate the type of the inner BIER packet through a Next Header field in the IPv6 header; or
- a third indicating unit, configured to indicate the type of the inner BIER packet through an MPLS label In some embodiments, the data processing apparatus further includes:
- a first indicating sub-module, configured to indicate an identifier of at least one receiving device through a BitString in the inner BIER packet.

In some embodiments, the data processing apparatus further includes:
- an establishing sub-module, configured to establish a Service Function Forwarder-based (SFF-based) BIER header; and
- a third encapsulating sub-module, configured to encapsulate an outer BIER packet at an outer layer of the target packet, wherein the outer BIER packet carries the SFF-based BIER header.

In some embodiments, the data processing apparatus further includes:
- a second indicating sub-module, which is configured to indicate an SFF-based BFR-ID through a BitString in the outer BIER packet.

According to the embodiments of the present disclosure, also provided is a data processing apparatus applied to a Service Function Forwarder (SFF). The data processing apparatus includes:
- a second receiving module, configured to receive a target packet sent by an ingress device according to a Service Function Chaining (SFC) path indication, wherein the target packet is a packet obtained by encapsulating, by the ingress device, a received multicast packet requiring SFC processing, and the target packet includes an SFC path indication and an egress device-based Bit Indexed Explicit Replication (BIER) header; and
- a second sending module, configured to send the multicast packet to at least one egress device according to the egress device-based BIER header.

In some embodiments, the second sending module includes:
- a removing sub-module, configured to remove an outer encapsulation of the target packet to obtain the SFC path indication;
- a first sending sub-module, configured to send the target packet to at least one SFF according to the SFC path indication, wherein the SFF is used for performing service function processing on the target packet;
- a decapsulating sub-module, configured to decapsulate, when the SFF is a last-hop SFF of SFC, the SFC path indication of the target packet to obtain an inner BIER packet with which the multicast packet is encapsulated; and;
- a second sending sub-module, configured to send the multicast packet to the egress device according to the inner BIER packet.

In some embodiments, the second sending sub-module includes:
- a first determining unit, configured to determine that the target packet is followed by a Network Service Header (NSH) packet according to indication of a Proto field in an outer BIER packet, and determining that the target packet is an inner BIER packet according to a Next Proto field in the NSH packet; or determining that the target packet is an inner BIER packet according to indication of an MPLS label or a Next Proto field of IPv6; and
- a first sending unit, configured to send the multicast packet to the egress device according to the inner BIER packet.

In some embodiments, the first sending sub-module includes:
- a fourth encapsulating unit, configured to re-encapsulate the target packet with an outer BIER packet according to the SFC path indication, and setting a destination BitString of a BIER header of the outer BIER packet as a Bit-Forwarding Router Identifier (BFR-ID) of a next-hop SFF; and
- a second sending unit, configured to send the target packet to the at least one SFF according to a pre-generated BIER forwarding table entry.

In some embodiments, the first sending unit is further configured to:

when the SFF is the last-hop SFF in the SFC path indication, remove the encapsulation of the target packet until the inner BIER packet and the carried multicast packet remain, and send the multicast packet to the egress device according to a pre-generated BIER forwarding table entry and a destination BitString in the inner BIER packet.

In some embodiments, the data processing apparatus further includes:

a second determining unit, configured to, when it is determined that there are a plurality of next-hop SFFs in the BIER forwarding table entry according to the SFC path indication, determine the next-hop SFF according to shortest path criteria and forward the target packet to the next-hop SFF; or a forwarding unit, configured to forward the target packet according to a pre-generated SFF-based forwarding complementary table entry, and correspondingly modify a destination BitString in the inner BIER packet.

In some embodiments, the data processing apparatus further includes:

a third determining unit, configured to determine, for a target SFF having backup, paths to respective egress devices; and an establishing unit, configured to establish forwarding complementary table entries of the target SFF towards the respective egress devices according to shortest path criteria.

According to the embodiments of the present disclosure, also provided is a computer-readable storage medium. The computer-readable storage medium stores a computer program, wherein the computer program is configured to execute the operations in any one of the method embodiments when running.

According to the embodiments of the present disclosure, also provided is an electronic apparatus, including a memory and a processor, wherein the memory stores a computer program, and the processor is configured to run the computer program to execute the operations in any one of the method embodiments.

DETAILED DESCRIPTION

Embodiments of the present disclosure will be described below in detail with reference to the drawings and embodiments.

It should be noted that the terms "first" and "second" in the description, claims, and accompanying drawings of the present disclosure are used to distinguish similar objects, and are not necessarily used to describe a specific sequence or order.

Figure 1:
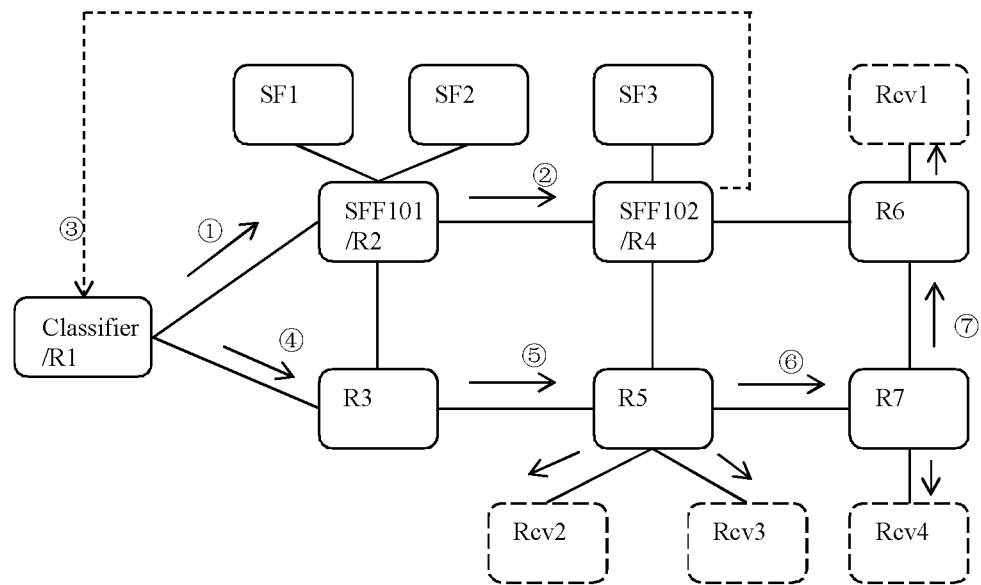
FIG. 1 is a schematic diagram of transmission of network data in the related art.
Figure 2:
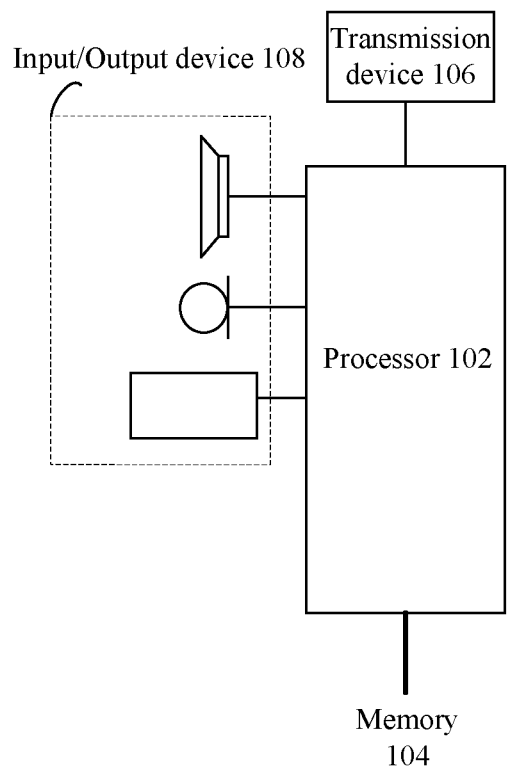
FIG. 2 is a block diagram of a hardware structure of a mobile terminal for a data processing method according to the embodiments of the present disclosure.

The method embodiments provided in the embodiments of the present disclosure may be implemented in a mobile terminal, a computer terminal, or a similar computing apparatus. Taking the operation on a mobile terminal as an example, FIG. 2 is a block diagram of a hardware structure of the mobile terminal of the data processing method according to the embodiments of the present disclosure. As shown in FIG. 2, the mobile terminal may include one or more (only one is shown in FIG. 2) processors 102 (the processors 102 may include, but are not limited to, a processing apparatus such as a microprocessor (e.g., Micro Controller Unit (MCU)) or a programmable logic device (e.g., Field Programmable Gate Array (FPGA)) and a memory 104 configured to store data. The mobile terminal may further include a transmission device 106 configured to perform communication functions and an input/output device 108. A person having ordinary skill in the art may understand that the structure shown in FIG. 2 is merely exemplary, which does not limit the structure of the foregoing mobile terminal. For example, the mobile terminal may further include more or fewer components than shown in FIG. 2, or have a different configuration from that shown in FIG. 2.

The memory 104 may be configured to store a computer program, for example, a software program and modules of application software, such as a computer program corresponding to the data processing method in the embodiments of the present disclosure. The processor 102 runs the computer program stored in the memory 104 to execute various functional applications and data processing, that is, to implement the foregoing method. The memory 104 may include high-speed random access memory, and may also include non-volatile memory, such as one or more magnetic storage devices, flash memory, or other non-volatile solid-state memory. In some instances, memory 104 may further include memory remotely located with respect to the one or more processors 102, and may be connected to the mobile terminal over a network. Examples of such network include, but are not limited to, the Internet, intranet, local area network, mobile communication network, and combinations thereof.

The transmission device 106 is configured to receive or transmit data via a network. Specific examples of the described network may include a wireless network provided by a communication provider of the mobile terminal. In an example, the transmission device 106 may include a Network Interface Controller (NIC) that may be coupled to other network devices via a base station to communicate with the Internet. In an example, the transmission device 106 may be a Radio Frequency (RF) module configured to communicate with the Internet wirelessly.

Figure 3:
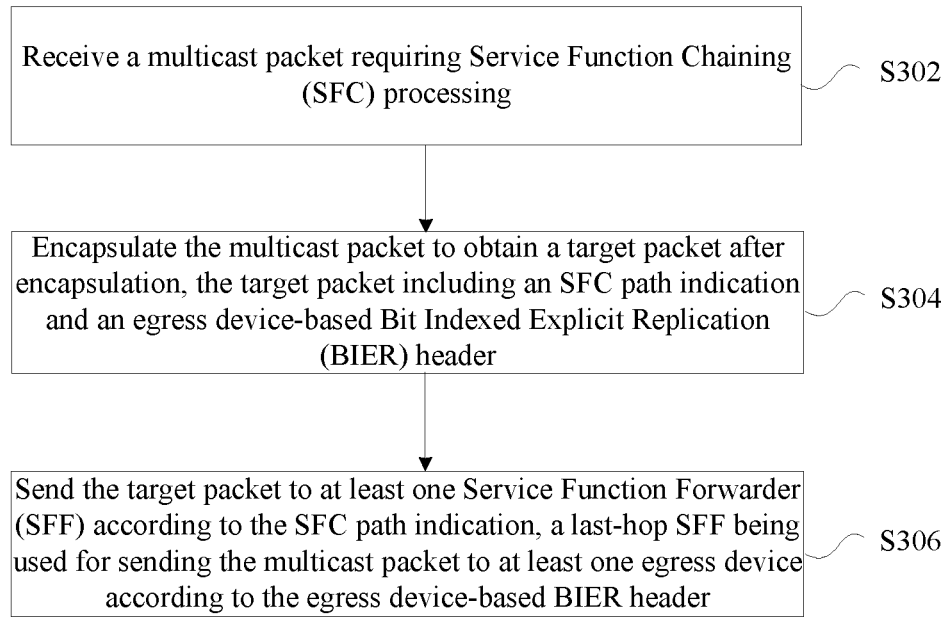
FIG. 3 is a first flowchart of a data processing method according to the embodiments of the present disclosure.

The embodiments of the present disclosure provide a data processing method running on the described mobile terminal or network architecture. FIG. 3 is a first flowchart of a data processing method according to the embodiments of the present disclosure. As shown in FIG. 3, the data processing method is applied to an ingress device. The data processing method includes the following operations S302 to S306.

At S302, a multicast packet requiring Service Function Chaining (SFC) processing is received.

At S304, the multicast packet is encapsulated to obtain a target packet after encapsulation, wherein the target packet includes an SFC path indication and an egress device-based Bit Indexed Explicit Replication (BIER) header.

At S306, the target packet is sent to at least one Service Function Forwarder (SFF) according to the SFC path indication, wherein a last-hop SFF is used for sending the multicast packet to at least one egress device according to the egress device-based BIER header.

By means of the above operations 302 to S306, for a multicast packet requiring SFC service assurance, an SFC path indication and an egress device-based BIER header are encapsulated into the multicast packet to obtain a target packet; and after the processing of the SFC is completed, a last-hop SFF forwards the multicast packet according to the egress device-based BIER header, so that the target packet reaches the egress device. The problem in the related art that roundabout processing of a multicast traffic when forwarding the multicast traffic according to a multicast tree causes a great waste of network resources can be solved, avoiding the roundabout processing greatly reduces the waste of network resources.

In some embodiments, S304 may include, for example, the following operations S3041 and S3042.

At S3041, the multicast packet is encapsulated with an inner BIER packet, wherein the inner BIER packet carries a Bit-Forwarding Router Identifier (BFR-ID) of the egress device, and the multicast packet is encapsulated as a payload after the egress device-based BIER header.

At S3042, the multicast packet, encapsulated with the inner BIER packet, is encapsulated together with the SFC path indication to obtain the target packet.

In some embodiments, S3042 may include, for example, one of the following operations:
  encapsulating the multicast packet, encapsulated with the inner BIER packet, together with a Network Service Header (NSH) to obtain the target packet, wherein the NSH carries the SFC path indication;
  encapsulating the multicast packet, encapsulated with the inner BIER packet, by using an Internet Protocol version 6 (IPv6) to obtain the target packet, wherein an IPv6 header includes a Segment Routing Header (SRH), and the SRH carries the SFC path indication;
  encapsulating the multicast packet, encapsulated with the inner BIER packet, by using a Multiprotocol Label Switching (MPLS) to obtain the target packet, wherein an MPLS protocol stack carries the SFC path indication.

In some embodiments, a type of the inner BIER packet is indicated through a Next Proto field in the NSH; or the type of the inner BIER packet is indicated through a Next Header field in the IPv6 header; or the type of the inner BIER packet is indicated through an MPLS label.

In some embodiments, an identifier of at least one receiving device is indicated through a BitString in the inner BIER packet.

In some embodiments, after the multicast packet, encapsulated with the inner BIER packet, is encapsulated together with the SFC path indication to obtain the target packet, a Service Function Forwarder-based (SFF-based) BIER header is established; and an outer BIER packet is encapsulated at an outer layer of the target packet, wherein the outer BIER packet carries the SFF-based BIER header.

In some other embodiments, an SFF-based BFR-ID is indicated through a BitString in the outer BIER packet.

Figure 4:
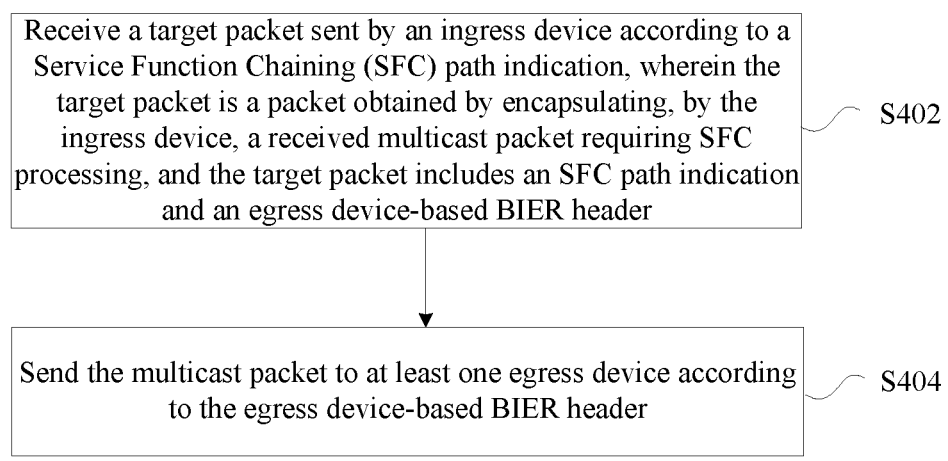
FIG. 4 is a second flowchart of a data processing method according to the embodiments of the present disclosure.

According to the embodiments of the present disclosure, also provided is a data processing method. FIG. 4 is a second flowchart of a data processing method according to the embodiments of the present disclosure. As shown in FIG. 4, the data processing method is applied to a Service Function Forwarder (SFF). The data processing method includes the following operations S402 and S404.

At S402, a target packet sent by an ingress device according to a Service Function Chaining (SFC) path indication is received, wherein the target packet is a packet obtained by encapsulating, by the ingress device, a received multicast packet requiring SFC processing, and the target packet includes an SFC path indication and an egress device-based Bit Indexed Explicit Replication (BIER) header.

At S404, the multicast packet is sent to at least one egress device according to the egress device-based BIER header.

By means of the above operations 402 to S404, for a multicast packet requiring SFC service assurance, an SFC path indication and an egress device-based BIER header are encapsulated into the multicast packet to obtain a target packet; and after the processing of the SFC is completed, a last-hop SFF forwards the multicast packet according to the egress device-based BIER header, so that the target packet reaches the egress device. The problem in the related art that roundabout processing of a multicast traffic when forwarding the multicast traffic according to a multicast tree causes a great waste of network resources can be solved, avoiding the roundabout processing greatly reduces the waste of network resources.

In some embodiments, S404 may include, for example, the following operations S4041 to S4044.

At S4041, an outer encapsulation of the target packet is removed to obtain the SFC path indication.

At S4042, the target packet is sent to at least one SFF according to the SFC path indication, wherein the SFF is used for performing service function processing on the target packet. Furthermore, the target packet may be re-encapsulated with an outer BIER packet according to the SFC path indication, and a destination BitString of a BIER header of the outer BIER packet may be set as a Bit-Forwarding Router Identifier (BFR-ID) of a next-hop SFF; and the target packet may be sent to the at least one SFF according to a pre-generated BIER forwarding table entry.

At S4043, when the SFF is a last-hop SFF of SFC, the SFC path indication of the target packet is decapsulated to obtain an inner BIER packet with which the multicast packet is encapsulated.

At S4044, the multicast packet is sent to the egress device according to the inner BIER packet. Furthermore, it may be determining that the target packet is followed by a Network Service Header (NSH) packet according to indication of a Proto field in an outer BIER packet, and it may be determined that the target packet is an inner BIER packet according to a Next Proto field in the NSH packet; alternatively, it may be determined that the target packet is an inner BIER packet according to indication of an MPLS label or a Next Proto field of IPv6. The multicast packet may be sent to the egress device according to the inner BIER packet. In some embodiments, sending the multicast packet to the egress device according to the inner BIER packet may include, for example, the following operations: when the SFF is the last-hop SFF in the SFC path indication, the encapsulation of the target packet is removed until the inner BIER packet and the carried multicast packet remain, and the multicast packet is sent to the egress device according to a pre-generated BIER forwarding table entry and a destination BitString in the inner BIER packet.

In some embodiments, when it is determined that there are a plurality of next-hop SFFs in the BIER forwarding table entry according to the SFC path indication, the next-hop SFF may be determined according to shortest path criteria and the target packet may be forwarded to the next-hop SFF; or the target packet may be forwarded according to a pre-generated SFF-based forwarding complementary table entry, and a destination BitString in the inner BIER packet is correspondingly modified.

In some other embodiments, for a target SFF having backup, paths to respective egress devices may be determined; and forwarding complementary table entries of the target SFF towards the respective egress devices may be established according to shortest path criteria.

In the embodiments, a BIER technology is used in combination with an SFC technology, a BIER type is added in a Next Protocol field of an NSH of an SFC, and an indication of the NSH SFC type is also added in a Proto field of the BIER. Alternatively, other indications that can be recognized by the device, or added or modified field identifiers, or new TLV extension may also be adopted for implementation. The implementation of the SFC function on the multicast packet includes the following operations.

A classifier/ingress device firstly encapsulates a multicast packet requiring SFC service assurance with a BIER header (i.e., encapsulates a BIER header for the multicast packet requiring SFC service assurance), and indicates BFR-IDs of all egress devices in the BitString in the BIER header; then the classifier/ingress device encapsulates an NSH, a Next Protocol field of the NSH indicating that the NSH is followed by a BIER type.

After the packet is processed through the SFC, the last-hop SFF removes the outer encapsulation, and uses the BIER header after the NSH to perform multicast forwarding, so that the packet reaches the egress device.

When the NSH is not encapsulated explicitly but the SFC path is implemented by means of SR-MPLS or SRv6, the function is also implemented by combining the SR-MPLS or SRv6 with the subsequent BIER packet.

In addition, the BIER technology may also be used to implement a backup function of the SFC, that is, a plurality of devices may be deployed for implementing the same SF.

The implementation of the automatic routing of the SFF by using the BIER technology includes the following operations.

An SFF, especially an SFF with a backup, needs to be allocated with a BFR-ID so that the SFF can be involved in the BIER forwarding table entry.

In the SFF with a backup, BIER forwarding complementary table entries towards all egress devices may be generated according to shortest path criteria or other consideration criteria. This operation is an optimization operation, and in a case where the number of backup SFFs is not large, this operation may not be performed.

After encapsulating the packet based on the foregoing method, the classifier/ingress device encapsulates a BIER header at the outer layer of the NSH, and adds an NSH type to the Proto field of the BIER header.

When forwarding is performed according to the SFC path indication, in a case where the next-hop SFF has a backup, routing and forwarding is automatically implemented by the BIER. In a case where forwarding complementary table entries exist, normal BIER forwarding processing is also performed based on the inner BIER header.

After the processing of the SFC path is completed, multicast forwarding is performed by using the BIER header after the NSH, so that the packet reaches the egress device.

The NSH may also not exist explicitly, but the SFC function may be implemented by the SR-MPLS and SRv6 means, which are also applicable in the embodiments.

Figure 5:
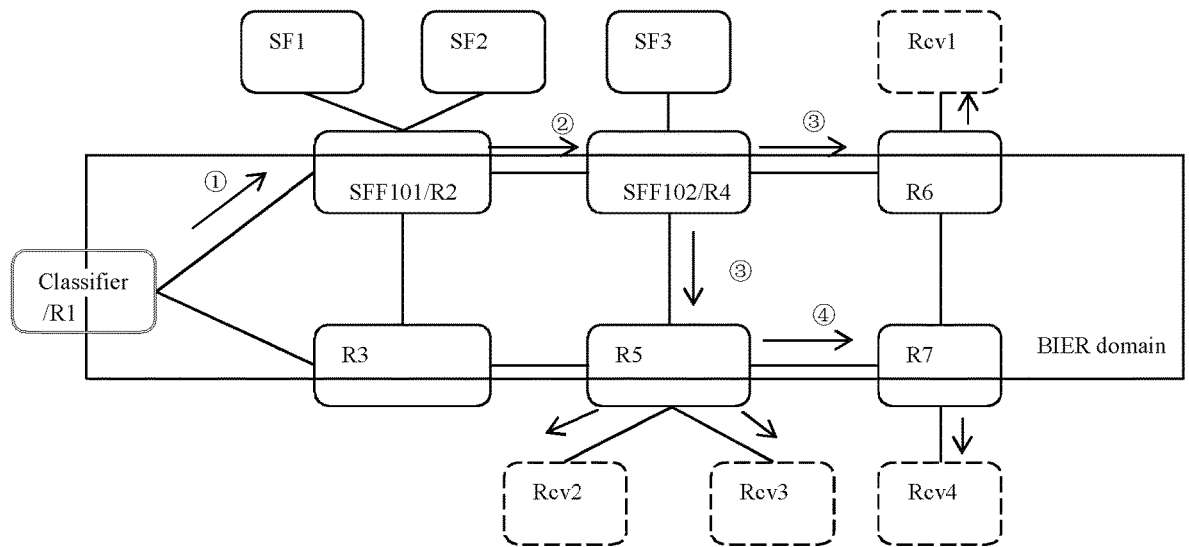
FIG. 5 is a first schematic diagram of data transmission in a network by using a BIER transmission technology according to the embodiments of the present disclosure.

FIG. 5 is a first schematic diagram of data transmission in a network by using a BIER transmission technology according to the embodiments of the present disclosure. As shown in FIG. 5, Rx represents a node such as a router or a switch for forwarding, R1 further serves as a Classifier in the SFC, R2 and R4 further serve as SFF (Service Function Forwarder), Rcvx represents a receiver of traffic, Rcv1 is connected to R6, Rcv2 and Rcv3 are connected to R5, and Rcv4 is connected to R7; and SFx represents different Service Functions (SF). Here, there may be multiple hops of forwarding devices between every two devices, and the illustration omits these forwarding devices only for simplification. R1-Rn establish a BIER domain, a BIER forwarding plane is established in the BIER domain in advance, and forwarding may be performed according to a BIER forwarding table.

Example 1

Figure 6:
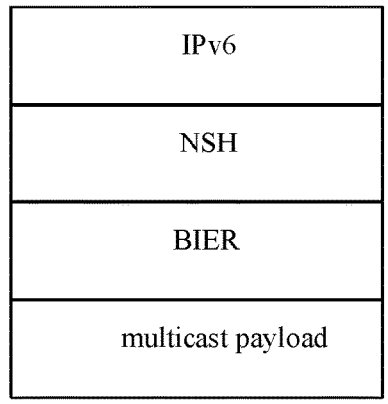
FIG. 6 is a first schematic diagram of a packet encapsulation structure according to the embodiments of the present disclosure.

As shown in FIG. 5, in addition to an SFC function in the network, a BIER domain is also deployed. Devices of the BIER domain include R1 to R7, wherein it is assumed that R1 serves as a Bit-Forwarding Ingress Router (BFIR), and R2/R3/R4/R5/R6/R7 serve as Bit-forwarding Egress Routers (BFER). It is assumed that a multicast packet needs to reach four receivers Rcv1 to Rcv4, and the multicast packet requires SFC processing, for example, the multicast packet requires the processing of service functions SF1 and SF3we. The egress devices corresponding to the receivers in the BIER domain are R5/R6/R7, and R1 may learn, by methods such as a BIER overlay protocol in the related art, that the traffic needs to be sent to R5/R6/R7. When the traffic is processed on R1, the multicast packet is first encapsulated with a BIER header, wherein a destination BitString in the BIER header points to R5/R6/R7. Then, an NSH (Network Service Header) of the SFC is encapsulated outside the packet, wherein the format of the NSH is defined by RFC8300, and a Next Protocol field of the NSH is set to indicate that the next protocol type is BIER, for example, a Next Protocol value of 100 indicates that the NSH is followed by a BIER header. The content of the NSH may follow the definition in the existing standards and may be encapsulated using Ethernet, MPLS, IPv4 or IPv6. Assuming that IPv6 encapsulation is used, FIG. 6 is a first schematic diagram of a packet encapsulation structure according to the embodiments. As shown in FIG. 6, in the encapsulated packet, the multicast packet is encapsulated as a payload after the BIER header, and the BIER header is encapsulated after the NSH.

In this way, the processing and forwarding flow of the multicast packet is as shown in FIG. 6. R1 encapsulates the packet and forwards the encapsulated packet to R2. R2 performs the processing of SF1 and then sends the packet after the processing to R4. R4 performs the processing of SF3, finds that the processing path of the SFC has been finished and therefore removes the NSH, and forwards the packet directly according to the inner BIER header. For example, in this network, R4 sends the multicast packet to R5/R6, R5 then forwards the multicast packet to R7 via the BIER, and finally the multicast packet reaches Rcv1/2/3/4.

It can be seen that, after the effective combination of the BIER and the SFC is applied, the roundabout processing of the traffic in the network can be avoided. In an exemplary implementation, the processing flow includes the following operations 101 to 107.

At 101, R1 (classifier) receives a multicast packet, finds that the receivers of the traffic are Rcv1-Rcv4 and the corresponding BFER devices are R5/R6/R7, and encapsulates a BIER header for the multicast packet, wherein a destination BitString indicates that the multicast packet needs to reach R5/R6/R7.

At 102, R1 finds, according to configuration or other indications, that the traffic requires SFC processing of SF1-SF3, and then R1 encapsulates an NSH at the outer layer of the packet, and sets the value of the Next Protocol field to indicate a BIER type. After an outer encapsulation, such as IPv6 routine encapsulation, R1 sends the packet to R2 according to the indication of the SFC.

At 103, after receiving the packet, R2 finds that the packet requires SF1 processing, forwards the packet to SF1 for processing, and then forwards the packet to a next-hop device R4 on the SFC path.

At 104, when receiving the packet, R4 finds that the packet requires SF3 processing, then forwards the packet to SF3 for processing, finds that the SFC processing has been completed, and then performs the processing of an inner packet.

At 105, R4 packet finds, according to the indication of a Next Protocol field in the NSH, that the NSH is followed by a BIER packet, and after removing the NSH, R4 processes the BIER header and forwards the BitString field according to the BIER forwarding table. The BIER forwarding table herein is generated when a BIER forwarding plane is initially established. From the perspective of R4, a shortest path to R5/R6/R7 includes a direct transmission path to R5 and R6, and a path to R7 through R5.

At 106, after receiving the packet, R5 processes the BitString in the BIER header and finds that a next-hop device R7 exists, and forwards the packet to R7 according to the BIER forwarding table. Meanwhile, R5 finds that R5 is also in the BitString, and after removing the BIER header, R5 finds that there are local receivers Rcv2 and Rcv3 according to the inner multicast packet, and therefore forwards the multicast packet to Rcv2 and Rcv3.

At 107, when R6 and R7 receive the packet, the processing flow is similar as that of R5. For example, R6/R7 processes the BitString in the BIER header and finds that R6/R7 is in the BitString and there is no need to further forward the packet to other devices. After removing the BIER header, R6/R7 forwards the packet to Rcv1 and Rcv4 according to the inner multicast packet.

Example 2

In some application scenarios, an independent NSH may not be encapsulated, and the same purpose may be achieved by using an existing network technology. For example, an SRv6 function may also be enabled in a network, because an SRH carried in an SRv6 may already carry the path of an NSH, and therefore an independent NSH does not need to be encapsulated in a packet, so that after the path of an SFC is completely processed by using the SRv6, multicast forwarding may be performed by using a BIER. The procedure in which SRv6 is replaced with SR-MPLS may also be implemented in a similar manner.

Figure 7:
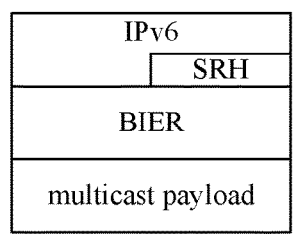
FIG. 7 is a second schematic diagram of a packet encapsulation structure according to the embodiments of the present disclosure.
Figure 8:
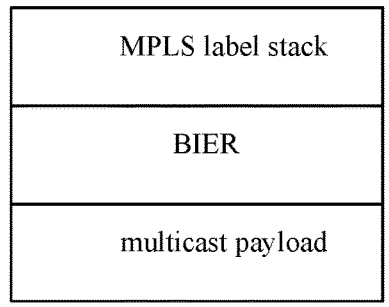
FIG. 8 is a third schematic diagram of a packet encapsulation structure according to the embodiments of the present disclosure.

Also as assumed in Example 1, the receivers of the multicast packet are also Rcv1-Rcv4, and the multicast packet requires assurance processing of services SF1 and SF3. The ingress device performs BIER encapsulation for a packet by taking the packet as a payload following a BIER header, sets a destination BitString as R5/R6/R7, and then performs outer path encapsulation of SRv6 or SR-MPLS. An SRv6 path from R1 to R2 and from R2 to R4 is encapsulated into an SRv6 path, and an IPv6 address or a label of SF1 and SF3 may also be encapsulated in the path, so as to indicate that the packet requires SF1 and SF3 processing. FIG. 7 is a second schematic diagram of a packet encapsulation structure according to the embodiments of the present disclosure. As shown in FIG. 7, in the encapsulated packet, the multicast packet is encapsulated as a payload following the BIER header, and the BIER header is encapsulated after an IPv6, wherein the IPv6 carries an SRH. FIG. 8 is a third schematic diagram of a packet encapsulation structure according to the embodiments of the present disclosure. As shown in FIG. 8, in the encapsulated packet, the multicast packet is encapsulated as a payload following the BIER header, and the BIER header is encapsulated after an MPLS label stack. In this way, after the packet is sent to R2 and R4 through the indication of SRv6 and is processed by SF1 and SF3 respectively, R4 performs BIER multicast forwarding for the packet and forwards the packet to the receivers. In an exemplary implementation, the processing flow includes the following operations 201 to 207.

At 201, R1 (classifier) receives a multicast packet, finds that the receivers of the traffic are Rcv1-Rcv4, and then encapsulates a BIER header for the multicast packet, wherein a destination BitString indicates that the multicast packet needs to reach R5/R6/R7.

At 202, R1 finds, according to configuration or other indications, that the traffic requires SFC processing of SF1-SF3, wherein the SFC may be implemented by SRv6 or SR-MPLS, and then R1 encapsulates an SRH header or an MPLS label stack at an outer layer of the packet, and indicates, in a Next Header field of IPv6, that the IPv6 is followed by a BIER header, or indicates, in an MPLS label, that the MPLS is followed by a BIER header. R1 sends the packet to R2 according to the indication of the service path.

At 203, after receiving the packet, R2 finds that the packet requires SF1 processing, forwards the packet to SF1 for processing, and then forwards the packet to a next-hop device R4 according to the indication of the SRv6 or SR-MPLS.

At 204, when receiving the packet, R4 finds out that the packet requires SF3 processing, then forwards the packet to SF3 for processing, finds that the processing of the SR path has been completed, and then performs the processing of an inner packet.

At 205, R4 packet finds, according to the Next Header in the IPv6 header or the indication of the MPLS label, that the IPv6 or MPLS is followed by a BIER header, R4 removes the outer encapsulation, finds the destination R5/R6/R7 according to the BitString in the BIER header, and looks up in a pre-generated BIER forwarding table to perform further forwarding.

At 206, after receiving the packet, R5 finds, according to the BitString in the BIER header, that the BitString includes R5 and a next-hop device R7, and forwards the packet to R7 according to the BIER forwarding table. Meanwhile, R5 removes the BIER header, and sends the packet to local receivers Rcv2 and Rcv3 according to the inner multicast packet.

At 207, when R6 and R7 receive the packet, the processing flow is similar as that of R5. For example, R6/R7 finds that R6/R7 is in the BitString in the BIER header and there is no need to further forward the packet to other devices. After removing the BIER header, R6/R7 forwards the packet to Rcv1 and Rcv4 according to the inner multicast packet.

Example 3

Figure 9:
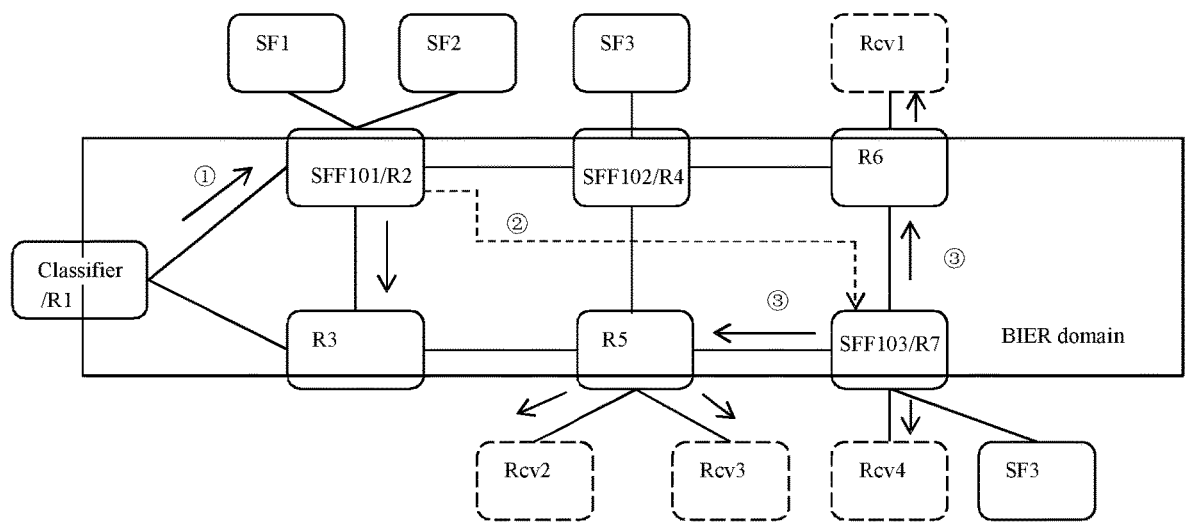
FIG. 9 is a second schematic diagram of data transmission in a network by using a BIER transmission technology according to the embodiments of the present disclosure.

In network deployment, the same SF may be provided in multiple devices so as to achieve good load balance. FIG. 9 is a second schematic diagram of data transmission in a network by using a BIER transmission technology according to the embodiments of the present disclosure. As shown in FIG. 9, it is assumed that multiple devices are deployed to provide SF3, and the multiple devices providing SF3 are respectively connected to SFFs R3 and R7. In a common application, one of the multiple devices is selected to be applied to the SFC. For example, in order to process SF1 and SF3, R2, R7 may be selected as an SFC path, and alternatively, R2, R4 may be selected as an SFC path. With reference to the operations in Example 1 or Example 2, the SFC processing for the multicast packet may be completed. However, the path is fixed on the classifier, and the automatic routing cannot be implemented by making full use of the multicast characteristic in the network. Assuming that the path R2, R7 is selected as the SFC path, as shown in FIG. 9, after being processed by SF1 of R2, the traffic is directly sent to R7 for processing of SF3, and is then sent to each receiver according to the BIER forwarding table on R7. However, the path is not optimal, and it can be seen that the traffic actually passes R5 when being sent from R2 to R7, but R5 does not know that it needs to process the traffic, and only simply forwards the packet to R7. After R7 processes and removes the service path encapsulation, R7 forwards the BIER packet to R5, which can then process the BIER packet. It can be seen that roundabout processing exists in the network. The SFC path R2, R4 for the traffic is actually better than the path R2, R7. However, any device in the network may serve as an ingress device, any combination of devices may serve as egress devices, and there is no simple algorithm to determine which path is the best.

Figure 10:
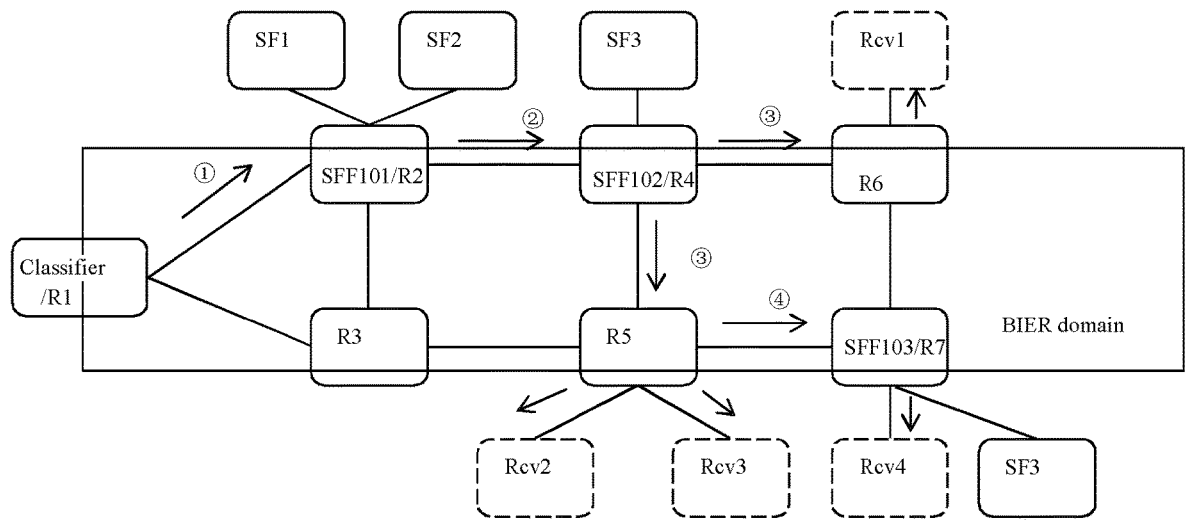
FIG. 10 is a third schematic diagram of data transmission in a network by using a BIER transmission technology according to the embodiments of the present disclosure.

FIG. 10 is a third schematic diagram of data transmission in a network by using a BIER transmission technology according to the embodiments of the present disclosure. As shown in FIG. 10, in a case where a BIER is deployed in the network, automatic routing and optimization of an SFC path can be implemented by using a new method. In the method, a BFR-ID is first allocated to each SFF, so that a BIER forwarding path towards each SFF may be included in a BIER forwarding table entry of the network. In the above examples 1 and 2, it is not mandatory to allocate the BFR-ID to the SFF, unless a receiver is connected to the SSF.

After processing a packet and encapsulating an SFC path (an encapsulation method referring to the described Example 1 or Example 2) for the packet, a classifier/ingress device further encapsulates a BIER header at an outer layer. This method combines the forwarding of the BIER path with the forwarding of the SFC. In a case where there are a plurality of next-hop devices (R4, R7) corresponding to the next hop (assumed to be SF3) of the SFC, a suitable next-hop device will be automatically selected according to an optimal path. Further, whether to send the packet to a plurality of next-hop devices at the same time may also be determined based on the actual forwarding table entries of the inner BIER. In the case of determining to send the packet to a plurality of next-hop devices, the destination BitString in the inner BIER header is modified correspondingly, so that the packet can be automatically routed to the best next-hop SF, or the packet can be processed by the SF on a plurality of paths and then be forwarded to real receivers, thus making full use of the multicast forwarding advantage, and achieving the purpose that the packet can reach the destination devices correctly through multiple backup devices providing the SF. In an exemplary implementation, the processing flow includes the following operations 301 to 306.

At 301, a BIER forwarding table entry based on an SFF (SFF-based BIER forwarding table entry) is established, a BFR-ID is allocated to each SFF in a network, and a BIER forwarding table entry towards the SFF is established through a common establishment process of a BIER forwarding plane. Similar to the basic establishment process of the BIER forwarding table, the BIER forwarding table includes entries towards R2/R4 in addition to entries towards R5/R6/R7.

At 302, when receiving a multicast packet, the ingress device encapsulates the inner BIER packet by using the method in Example 1 or Example 2, and then encapsulates the SFC path, for example, encapsulates the NSH.

Figure 11:
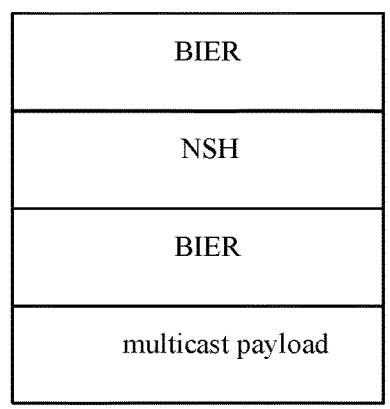
FIG. 11 is a fourth schematic diagram of a packet encapsulation structure according to the embodiments of the present disclosure.

At 303, when performing outer encapsulation, the classifier/ingress device performs outer BIER encapsulation according to the SFC path indication, wherein the BFR-ID of R2 is filled in the destination BitString. FIG. 11 is a fourth schematic diagram of a packet encapsulation structure according to the embodiments of the present disclosure. As shown in FIG. 11, a Proto field of the outer BIER of the encapsulated packet needs to be set to a value indicating that the outer BIER is followed by NSH, for example, set to 20 indicating that the outer BIER is followed by NSH. R1 forwards the packet to R2 in the BIER forwarding mode.

At 304, R2 receives the packet, finds that the outer BIER header is followed by the NSH according to the indication of the outer BIER header, performs SF1 processing according to the indication of the NSH, and when trying to forward the packet to perform SF3 processing, finds that there are two next-hop devices R4 and R7 that can perform SF3 processing, and R2 finds, according to the local shortest path criteria, a shortest path to R4. Therefore, R2 re-encapsulates the outer BIER header, and encapsulates R4 into the destination BitString of the BIER packet.

At 305, R4 receives the packet, finds that the outer BIER header is followed by the NSH according to the indication of the outer BIER header, and after performing SF3 processing, determines that the SFC processing is completed, then removes the outer packet header, directly uses the inner BIER header, and forwards the packet according to a BitString in the inner BIER header.

At 306, after receiving the packet in sequence, R5, R6 and R7 process the packet according to the operation 206/207 in Example 2, and finally forward the multicast packet to the receivers Rcv1-Rcv4.

Further, the above automatic selection manner of the next-hop device may be further optimized as follows.

After the operation 302, the following operations are performed.

At 321, an SFF with a backup establishes forwarding complementary table entries towards respective BFER egress devices. The establishment may be implemented by respectively calculating paths from the SFF with a backup to respective BFERs and keeping the shortest paths among the calculated paths. For example, as shown in FIG. 10, SF3 has backup (respectively R4 and R7), each SFF in the BIER domain will respectively calculate forwarding complementary table entries based on R4 and R7 respectively, for example, when R1/R2 calculates the paths taking R4 as the next hop, the shortest path to R5/R6/R7 can be calculated as R4.

At 322, after processing the packet and encapsulating the inner BIER packet in the manner provided in Example 1 or Example 2, the classifier/ingress device encapsulates an SFC path, for example, the classifier/ingress device encapsulates an NSH (or an NSH packet).

At 323, when the classifier/ingress device R1 further performs encapsulation at the outer layer of the NSH, outer BIER encapsulation is adopted according to the SFC path indication. Here, the BFR-ID of R2 is filled in the BitString. After R1 encapsulates the outer BIER header for the packet, the possible encapsulation mode is as shown in FIG. 11. In such a case, the Proto field of the outer BIER header needs to be set to a value indicating that the outer BIER header is followed by an NSH. R1 forwards the packet to R2 according to the BIER forwarding table.

At 324, R2 receives the packet, finds, according to the indication of the Proto field of the outer BIER header, that the outer BIER header is followed by the NSH, and performs SF1 processing according to the indication of the NSH. When trying to forward the packet to perform SF3 processing, R2 finds that there are two next-hop devices R4 and R7 that can provide the SF3 processing, according to the forwarding complementary table entries calculated in operation 321, R2 finds that the optimal next-hop device is R4 in the case where the packet needs to reach R5/R6/R7 according to the indication in the inner packet, therefore, R2 re-encapsulates the outer BIER header and encapsulates the BFR-ID of R4 into BitString, and forwards the packet to R4.

At 325, R4 receives the packet, finds, according to the indication of the outer BIER header, that the outer BIER header is followed by an NSH, and after performing SF3 processing according to the indication of the NSH, finds that the SFC processing is completed, then removes the outer BIER header and the NSH, keeps the inner BIER header, and forwards the packet according to the BitString.

At 326, R5, R6 and R7 receive the packet in sequence, process the packet according to the processing in operation 306. After the BIER header is removed, the multicast packet is forwarded to the receivers Rcv1-Rcv4.

Figure 12:
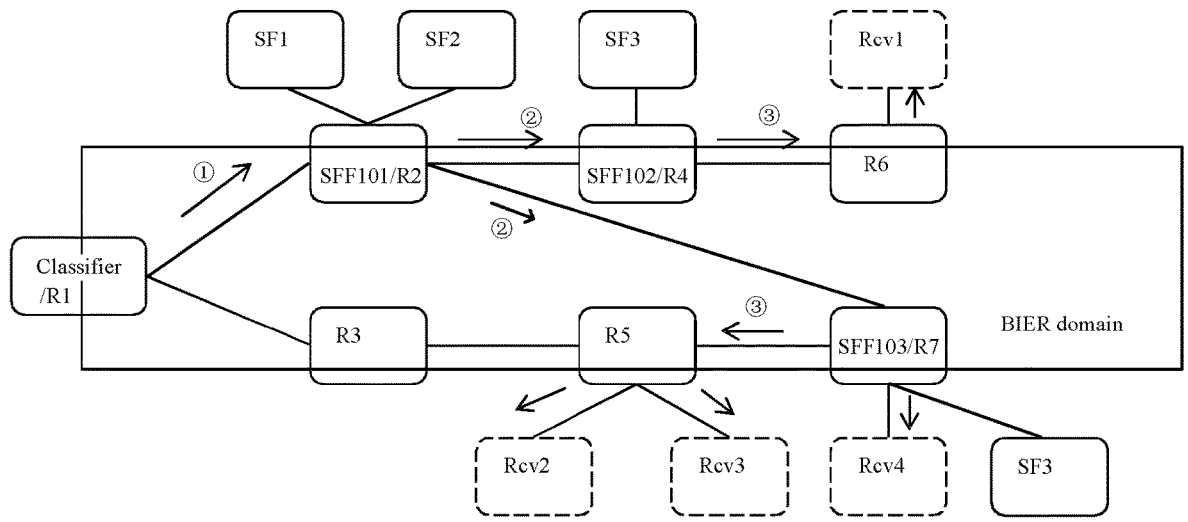
FIG. 12 is a fourth schematic diagram of data transmission in a network by using a BIER transmission technology according to the embodiments of the present disclosure.

FIG. 12 is a fourth schematic diagram of data transmission in a network by using a BIER transmission technology according to the embodiments of the present disclosure. As shown in FIG. 12, in other networking environments, for example, there may also be a situation that R1/R2 calculates that the next hop of the optimal path to R6 is R4, and the next hop of the optimal path to R5/R7 is R7.

Assuming the situation as shown in FIG. 12, in operation 324, R2 finds that the destination BitString in the BIER packet following the NSH is R5/R6/R7. According to the forwarding complementary table entry, the next hop SF3 on the SFC path corresponds to candidates R4 and R7, where R4 is the best next hop that can reach R6, and R7 is the best next hop that can reach R5/R7.

R2 also performs, according to the entry of R4, a BIER entry operation on a BIER header of an inner BIER packet (namely, an inner BIER packet header) after the NSH, that is, after an AND operation is performed between the destination R5/R6/R7 and the R6 indicated by R4, only R6 is left, therefore, the destination BitString of the inner BIER header is modified to only contain R6, and then an outer BIER header is re-encapsulated at the outer layer of the NSH, the BFR-ID of R4 is encapsulated into BitString, and the packet is forwarded to R4 through BIER forwarding.

R2 also performs, according to the entry of R7, a BIER entry operation on the inner BIER header after the NSH, that is, after an AND operation is performed between the destination R5/R7 (R6 has been removed after the operation of the complementary entry of R4) and the R5/R7 indicated by R7, R5/R7 is left, therefore, the destination BitString of the inner BIER header is modified to contain R5/R7, and then an outer BIER header is re-encapsulated at the outer layer of the NSH, the BFR-ID of R7 is encapsulated into the BitString, and the packet is forwarded to R7 according to the BIER forwarding table.

The processing after R4 and R7 receive the packet is the same as that in operation 325, and the processing after R5/R6/R7 receive the packet is the same as that in operation 326. Thus, under the condition that the automatic BIER routing is completed, load balancing of the same type of SF can be automatically realized.

In the above embodiments, if the classifier and the traffic ingress device BFIR are not located on the same device, the BFIR may encapsulate the BIER packet, and then the send the encapsulated BIER packet to the classifier device separately, and then the classifier device performs the NSH encapsulation processing.

It should be noted that, the calculation of the complementary table entries in operation 321 is to avoid a situation that repeated traffic may occur when a plurality of devices are provided for processing the same SF. When only one device is provided in the network for processing the SF having the same function, or when only a few such devices are provided, the complementary table entries may not be calculated. In this case, although repeated traffic may exist, the receiver can determine repetition and discard the repeated traffic, and the repeated traffic does not impose a large burden on the network.

In addition, if only one next hop exists during the SFF forwarding, the encapsulation and forwarding may also be performed in the unicast manner in Example 1 or Example 2, and the BIER encapsulation is not necessary.

With different deployment manners, the data processing methods in the above embodiments can be used independently, and can alternatively be used in combination, so that a combination of a BIER technology and an SFC technology can provide a simple implementation method for providing SFC assurance for a multicast packet, and automatic routing can be implemented to optimize forwarding when a plurality of devices are deployed for achieving the SF having the same function, which can expand application scenarios of the SFC technology. In addition, the solution in the embodiments of the present disclosure is also applicable to the BIER-TE technology.

With different deployment manners, the data processing methods in the above embodiments can be used independently, and can alternatively be used in combination, so that a combination of a BIER technology and an SFC technology can provide a simple implementation method for providing SFC assurance for a multicast packet, and automatic routing can be implemented to optimize forwarding when a plurality of devices are deployed for achieving the SF having the same function, which can expand application scenarios of the SFC technology. In addition, the solution in the embodiments of the present disclosure is also applicable to the BIER-TE technology.

Figure 13:
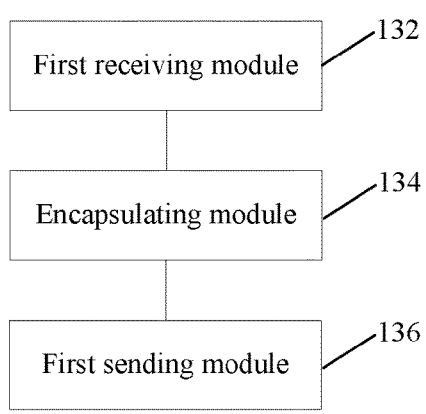
FIG. 13 is a first block diagram of a data processing apparatus according to the embodiments of the present disclosure.

According to the embodiments of the present disclosure, also provided is a data processing apparatus applied to an ingress device. FIG. 13 is a first block diagram of a data processing apparatus according to the embodiments of the present disclosure. As shown in FIG. 13, the data processing apparatus includes:

a first receiving module 132, configured to receive a multicast packet requiring Service Function Chaining (SFC) processing;

an encapsulating module 134, configured to encapsulate the multicast packet to obtain a target packet after encapsulation, wherein the target packet includes an SFC path indication and an egress device-based Bit Indexed Explicit Replication (BIER) header; and a first sending module 136, configured to send the target packet to at least one Service Function Forwarder (SFF) according to the SFC path indication, wherein a last-hop SFF is used for sending the multicast packet to at least one egress device according to the egress device-based BIER header.

In some embodiments, the encapsulating module 134 includes:

a first encapsulating sub-module, configured to encapsulate the multicast packet with an inner BIER packet, wherein the inner BIER packet carries a Bit-Forwarding Router Identifier (BFR-ID) of the egress device, and the multicast packet is encapsulated as a payload after the egress device-based BIER header; and a second encapsulating sub-module, configured to encapsulate the multicast packet, encapsulated with the inner BIER packet, together with the SFC path indication to obtain the target packet.

In some embodiments, the second encapsulating sub-module includes:

a first encapsulating unit, configured to encapsulate the multicast packet, encapsulated with the inner BIER packet, together with a Network Service Header (NSH) to obtain the target packet, wherein the NSH carries the SFC path indication;

a second encapsulating unit, configured to encapsulate the multicast packet, encapsulated with the inner BIER packet, by using an Internet Protocol version 6 (IPv6) to obtain the target packet, wherein an IPv6 header includes a Segment Routing Header (SRH), and the SRH carries the SFC path indication;

a third encapsulating unit, configured to encapsulate the multicast packet, encapsulated with the inner BIER packet, by using a Multiprotocol Label Switching (MPLS) to obtain the target packet, wherein an MPLS protocol stack carries the SFC path indication.

In some embodiments, the data processing apparatus further includes:

a first indicating unit, configured to indicate a type of the inner BIER packet through a Next Proto field in the NSH; or a second indicating unit, configured to indicate the type of the inner BIER packet through a Next Header field in the IPv6 header; or a third indicating unit, configured to indicate the type of the inner BIER packet through an MPLS label In some embodiments, the data processing apparatus further includes:

a first indicating sub-module, configured to indicate an identifier of at least one receiving device through a BitString in the inner BIER packet.

In some embodiments, the data processing apparatus further includes:

an establishing sub-module, configured to establish a Service Function Forwarder-based (SFF-based) BIER header; and a third encapsulating sub-module, configured to encapsulate an outer BIER packet at an outer layer of the target packet, wherein the outer BIER packet carries the SFF-based BIER header.

In some embodiments, the data processing apparatus further includes:

a second indicating sub-module, which is configured to indicate an SFF-based BFR-ID through a BitString in the outer BIER packet.

Figure 14:
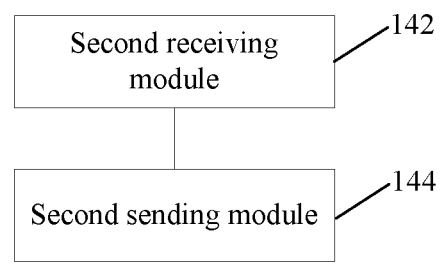
FIG. 14 is a second block diagram of a data processing apparatus according to the embodiments of the present disclosure.

According to the embodiments of the present disclosure, also provided is a data processing apparatus applied to a Service Function Forwarder (SFF). FIG. 14 is a second block diagram of a data processing apparatus according to the embodiments of the present disclosure. As shown in FIG. 14, the data processing apparatus includes:

a second receiving module 142, configured to receive a target packet sent by an ingress device according to a Service Function Chaining (SFC) path indication, wherein the target packet is a packet obtained by encapsulating, by the ingress device, a received multicast packet requiring SFC processing, and the target packet includes an SFC path indication and an egress device-based Bit Indexed Explicit Replication (BIER) header; and a second sending module 144, configured to send the multicast packet to at least one egress device according to the egress device-based BIER header.

In some embodiments, the second sending module 14 includes:

a removing sub-module, configured to remove an outer encapsulation of the target packet to obtain the SFC path indication;

a first sending sub-module, configured to send the target packet to at least one SFF according to the SFC path indication, wherein the SFF is used for performing service function processing on the target packet;

a decapsulating sub-module, configured to decapsulate, when the SFF is a last-hop SFF of SFC, the SFC path indication of the target packet to obtain an inner BIER packet with which the multicast packet is encapsulated; and;

a second sending sub-module, configured to send the multicast packet to the egress device according to the inner BIER packet.

In some embodiments, the second sending sub-module includes:

a first determining unit, configured to determine that the target packet is followed by a Network Service Header (NSH) packet according to indication of a Proto field in an outer BIER packet, and determining that the target packet is an inner BIER packet according to a Next Proto field in the NSH packet; or determining that the target packet is an inner BIER packet according to indication of an MPLS label or a Next Proto field of IPv6; and a first sending unit, configured to send the multicast packet to the egress device according to the inner BIER packet.

In some embodiments, the first sending sub-module includes:

a fourth encapsulating unit, configured to re-encapsulate the target packet with an outer BIER packet according to the SFC path indication, and setting a destination BitString of a BIER header of the outer BIER packet as a Bit-Forwarding Router Identifier (BFR-ID) of a next-hop SFF; and a second sending unit, configured to send the target packet to the at least one SFF according to a pre-generated BIER forwarding table entry.

In some embodiments, the first sending unit is further configured to:

when the SFF is the last-hop SFF in the SFC path indication, remove the encapsulation of the target packet until the inner BIER packet and the carried multicast packet remain, and send the multicast packet to the egress device according to a pre-generated BIER forwarding table entry and a destination BitString in the inner BIER packet. In some embodiments, the data processing apparatus further includes:

a second determining unit, configured to, when it is determined that there are a plurality of next-hop SFFs in the BIER forwarding table entry according to the SFC path indication, determine the next-hop SFF according to shortest path criteria and forward the target packet to the next-hop SFF; or a forwarding unit, configured to forward the target packet according to a pre-generated SFF-based forwarding complementary table entry, and correspondingly modify a destination BitString in the inner BIER packet.

In some embodiments, the data processing apparatus further includes:

a third determining unit, configured to determine, for a target SFF having backup, paths to respective egress devices; and an establishing unit, configured to establish forwarding complementary table entries of the target SFF towards the respective egress devices according to shortest path criteria.

It should be noted that each module may be implemented by software or hardware. The latter may be implemented in the following manner, but is not limited thereto. All the modules are located in a same processor; alternatively, the modules are located in different processors in an arbitrary combination.

The embodiments of the present disclosure further provide a computer-readable storage medium. The computer-readable storage medium stores a computer program, wherein the computer program is configured to execute the operations in any one of the method embodiments during running.

In an exemplary embodiment, the computer-readable storage medium may include, but is not limited to, any medium that can store a computer program, such as a USB flash drive, a Read-Only Memory (ROM), a Random Access Memory (RAM), a removable hard disk, a magnetic disk, or an optical disc.

The embodiments of the present disclosure also provide an electronic apparatus, including a memory and a processor, wherein the memory stores a computer program, and the processor is configured to run the computer program to execute the operations in any one of the method embodiments.

In an exemplary embodiment, the electronic apparatus may further include a transmission device and an input/output device, wherein the transmission device is connected to the processor, and the input/output device is connected to the processor.

For specific examples in the embodiments, reference may be made to the examples described in the foregoing embodiments and exemplary embodiments, and details are not repeatedly described in this embodiment.

Obviously, those having ordinary skill in the art should understand that each module or each operation of the present disclosure may be implemented by a universal computing device, and the modules or operations may be concentrated on a single computing device or distributed on a network formed by a plurality of computing devices, and may be implemented by program codes executable for the computing devices, so that the modules or operations may be stored in a storage device for execution with the computing devices, the shown or described operations may be executed in sequences different from those described here in some cases, or may form each integrated circuit module respectively, or multiple modules or operations therein may form a single integrated circuit module for implementation. Thus, the present disclosure is not limited to any particular combination of hardware and software.

The foregoing descriptions are merely exemplary embodiments of the present disclosure, but are not intended to limit the present disclosure. For those having ordinary skill in the art, the present disclosure may have various modifications and variations. Any modifications, equivalent replacements, improvements and the like made within the principle of the present disclosure shall belong to the scope of protection of the present disclosure.

What is claimed is:

1. A data processing method applied to an ingress device, the data processing method comprising:

receiving a multicast packet requiring Service Function Chaining (SFC) processing;

encapsulating the multicast packet to obtain a target packet after encapsulation, wherein the target packet comprises an SFC path indication and an egress device-based Bit Indexed Explicit Replication (BIER) header; and sending the target packet to at least one Service Function Forwarder (SFF) according to the SFC path indication, wherein a last-hop SFF is used for sending the multicast packet to at least one egress device according to the egress device-based BIER header.

2. The data processing method according to claim 1, wherein encapsulating the multicast packet to obtain the target packet after encapsulation comprises:

encapsulating the multicast packet with an inner BIER packet, wherein the inner BIER packet carries a Bit-Forwarding Router Identifier (BFR-ID) of the egress device, and the multicast packet is encapsulated as a payload after the egress device-based BIER header; and encapsulating the multicast packet, encapsulated with the inner BIER packet, together with the SFC path indication to obtain the target packet.

3. The data processing method according to claim 2, wherein encapsulating the multicast packet, encapsulated with the inner BIER packet, together with the SFC path indication to obtain the target packet comprises one of:
encapsulating the multicast packet, encapsulated with the inner BIER packet, together with a Network Service Header (NSH) to obtain the target packet, wherein the NSH carries the SFC path indication;
encapsulating the multicast packet, encapsulated with the inner BIER packet, by using an Internet Protocol version 6 (IPv6) to obtain the target packet, wherein an IPV6 header comprises a Segment Routing Header (SRH), and the SRH carries the SFC path indication;
encapsulating the multicast packet, encapsulated with the inner BIER packet, by using a Multiprotocol Label Switching (MPLS) to obtain the target packet, wherein an MPLS protocol stack carries the SFC path indication.

4. The data processing method according to claim 3, further comprising:
indicating a type of the inner BIER packet through a Next Proto field in the NSH; or
indicating the type of the inner BIER packet through a Next Header field in the IPV6 header; or
indicating the type of the inner BIER packet through an MPLS label.

5. The data processing method according to claim 2, further comprising:
indicating an identifier of at least one receiving device through a BitString in the inner BIER packet.

6. The data processing method according to claim 2, wherein after encapsulating the multicast packet, encapsulated with the inner BIER packet, together with the SFC path indication to obtain the target packet, the data processing method further comprises:
establishing a Service Function Forwarder-based (SFF-based) BIER header; and
encapsulating an outer BIER packet at an outer layer of the target packet, wherein the outer BIER packet carries the SFF-based BIER header.

7. The data processing method according to claim 6, further comprising:
indicating an SFF-based BFR-ID through a BitString in the outer BIER packet.

8. A data processing method applied to a Service Function Forwarder (SFF), the data processing method comprising:
receiving a target packet sent by an ingress device according to a Service Function Chaining (SFC) path indication, wherein the target packet is a packet obtained by encapsulating, by the ingress device, a received multicast packet requiring SFC processing, and the target packet comprises an SFC path indication and an egress device-based Bit Indexed Explicit Replication (BIER) header; and
sending the multicast packet to at least one egress device according to the egress device-based BIER header.

9. The data processing method according to claim 8, wherein sending the multicast packet to the egress device according to the egress device-based BIER header comprises:
removing an outer encapsulation of the target packet to obtain the SFC path indication;
sending the target packet to at least one SFF according to the SFC path indication, wherein the SFF is used for performing service function processing on the target packet;
when the SFF is a last-hop SFF of SFC, decapsulating the SFC path indication of the target packet to obtain an inner BIER packet with which the multicast packet is encapsulated; and
sending the multicast packet to the egress device according to the inner BIER packet.

10. The data processing method according to claim 9, wherein sending the multicast packet to the egress device according to the inner BIER packet comprises:
determining that the target packet is followed by a Network Service Header (NSH) packet according to indication of a Proto field in an outer BIER packet, and determining that the target packet is an inner BIER packet according to a Next Proto field in the NSH packet; and
sending the multicast packet to the egress device according to the inner BIER packet.

11. The data processing method according to claim 10, wherein sending the target packet to the at least one SFF according to the SFC path indication comprises:
re-encapsulating the target packet with an outer BIER packet according to the SFC path indication, and setting a destination BitString of a BIER header of the outer BIER packet as a Bit-Forwarding Router Identifier (BFR-ID) of a next-hop SFF; and
sending the target packet to the at least one SFF according to a pre-generated BIER forwarding table entry.

12. The data processing method according to claim 9, wherein sending the multicast packet to the egress device according to the inner BIER packet comprises:
when the SFF is the last-hop SFF in the SFC path indication, removing the encapsulation of the target packet until the inner BIER packet and the carried multicast packet remain, and sending the multicast packet to the egress device according to a pre-generated BIER forwarding table entry and a destination BitString in the inner BIER packet.

13. The data processing method according to claim 11, further comprising:
when it is determined that there are a plurality of next-hop SFFs in the BIER forwarding table entry according to the SFC path indication, determining the next-hop SFF according to shortest path criteria and forwarding the target packet to the next-hop SFF; or
forwarding the target packet according to a pre-generated SFF-based forwarding complementary table entry, and correspondingly modifying a destination BitString in the inner BIER packet.

14. The data processing method according to claim 13, further comprising:
for a target SFF having backup, determining paths to respective egress devices; and
establishing forwarding complementary table entries of the target SFF towards the respective egress devices according to shortest path criteria.

15. A non-transitory computer-readable storage medium, wherein the computer-readable storage medium stores a computer program, and the computer program is configured to execute the data processing method according to claim 1 when running.

16. An electronic apparatus, comprising a memory and a processor, wherein the memory stores a computer program, and the processor is configured to run the computer program to execute the data processing method according to claim 1.

17. A non-transitory computer-readable storage medium, wherein the computer-readable storage medium stores a computer program, and the computer program is configured to execute the data processing method according to claim 8 when running.

18. An electronic apparatus, comprising a memory and a processor, wherein the memory stores a computer program, and the processor is configured to run the computer program to execute the data processing method according to claim 8.

19. The data processing method according to claim 9, wherein sending the multicast packet to the egress device according to the inner BIER packet comprises:
- determining that the target packet is an inner BIER packet according to indication of an MPLS label or a Next Proto field of IPV6; and
- sending the multicast packet to the egress device according to the inner BIER packet.

20. The data processing method according to claim 19, wherein sending the target packet to the at least one SFF according to the SFC path indication comprises:
- re-encapsulating the target packet with an outer BIER packet according to the SFC path indication, and setting a destination BitString of a BIER header of the outer BIER packet as a Bit-Forwarding Router Identifier (BFR-ID) of a next-hop SFF; and
- sending the target packet to the at least one SFF according to a pre-generated BIER forwarding table entry.

* * * * *